Figure 1:
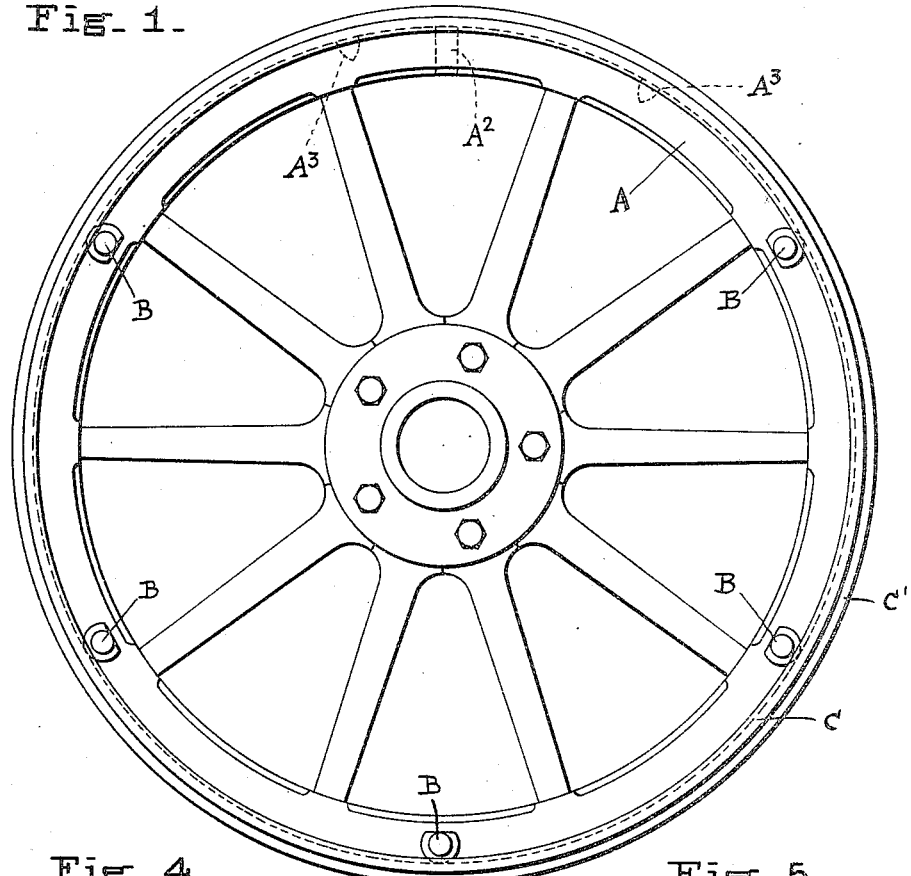

R. P. SCOTT.
DEMOUNTABLE RIM FOR PNEUMATIC TIRES.
APPLICATION FILED MAR. 14, 1911.

1,075,501.

Patented Oct. 14, 1913.

2 SHEETS—SHEET 1.

WITNESSES:
J. Clyde Ripley
Millie Tetzlaff

INVENTOR
Robert P. Scott.
BY
Lyons & Bisnop
ATTORNEYS

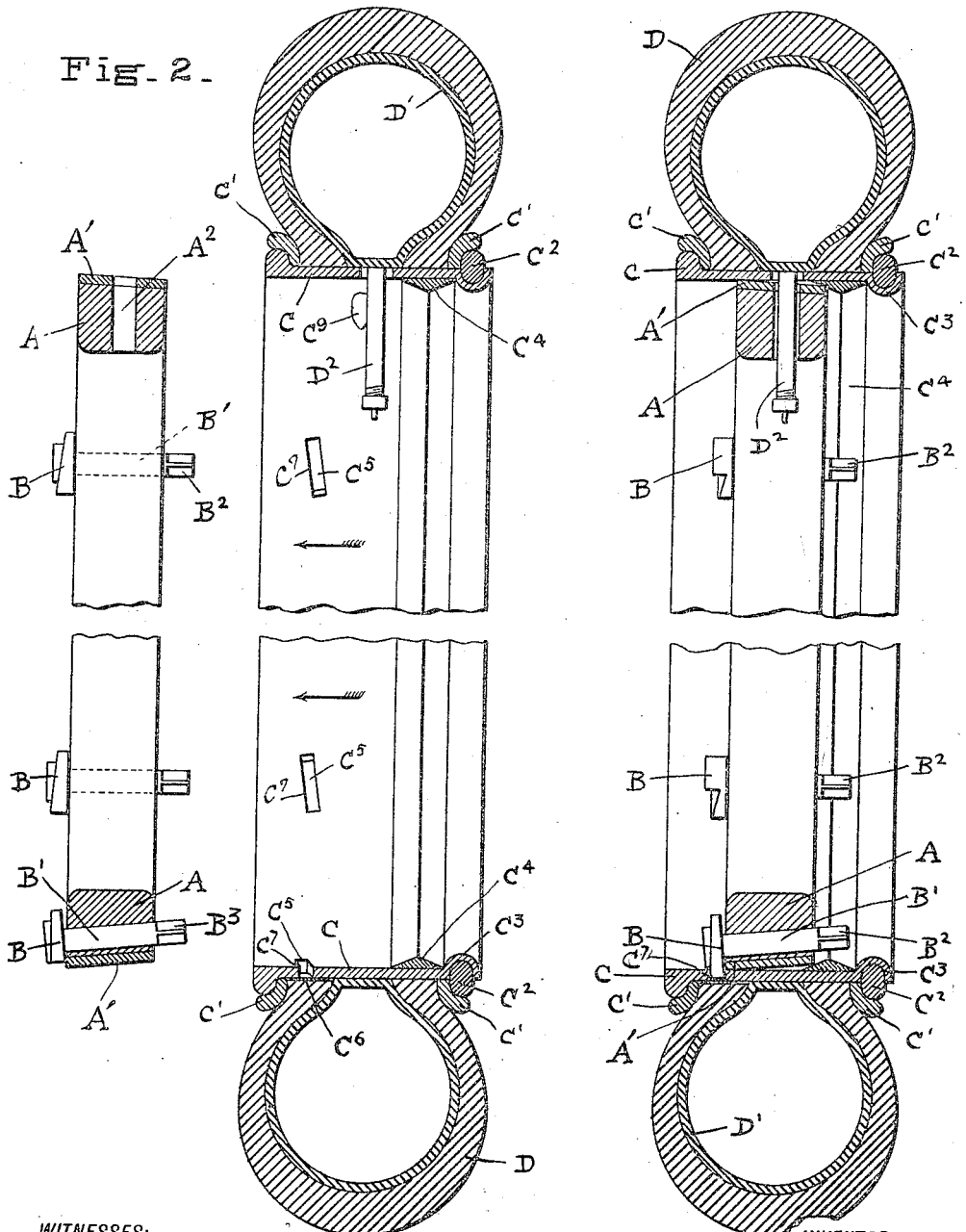

UNITED STATES PATENT OFFICE.

ROBERT P. SCOTT, OF CADIZ, OHIO.

DEMOUNTABLE RIM FOR PNEUMATIC TIRES.

1,075,501. Specification of Letters Patent. Patented Oct. 14, 1913.

Application filed March 14, 1911. Serial No. 614,476.

*To all whom it may concern:*

Be it known that I, ROBERT P. SCOTT, a citizen of the United States, residing at Cadiz, in the county of Harrison, State of Ohio, have invented a new and useful Improvement in Demountable Rims for Pneumatic Tires, of which the following is a specification.

The object of my invention is to devise a demountable wheel rim for pneumatic tires, which shall be simple and cheap in construction, which will go on and come off the felly with ease, even when the parts are caked with dirt or cemented with rust, and which requires the manipulation of the minimum number of parts in the process of attaching or detaching the rim to or from the wheel. To this end, I provide a wheel having a felly, the exterior, circular surface of which is a frusto-cone. More briefly stated, I provide a frusto-conical felly-structure, and I have the small base of the cone toward that face of the wheel which is away from the vehicle. For convenience this face will be designated as the front and the other as the rear face of the wheel. At several points around the felly of such wheel, I place screw-disks, otherwise known as face cams having cut away segments, carried on axes which laterally traverse the felly, the screws being situated at the rear and the ends of the shafts, which are squared, being situated at the front of the wheel. When the wheel is free of its rim, these screws will have their cut away portions flush with the surface of the felly-structure, which will thus present a smooth, unobstructed frusto-conical face upon which we may slide the demountable rim.

The rim itself may be of any usual construction in so far as the devices are concerned which relate to the securement of the pneumatic tire in place thereon, although I prefer the type in which a locking-ring for a replaceable rim-flange is carried in a depressed groove, since the inner wall of such groove readily serves as an abutment for a ring which is wedge-shaped in cross section and which is mounted on the inner surface of the rim toward the front of the wheel. The inner rim surface is cylindrical and of a diameter equal to the large or rear base of the frusto cone. This rim is further provided with slots or grooves on the rear side, the side opposite the wedge-ring, for ultimate engagement with the screw-disks. The operation is now clear.

The rim, with its inner cylindrical surface, readily slides on the conical wheel over the front base, at which the cone is smallest. It passes over and beyond the wheel at its rear base, which its inner surface loosely fits, until the rim slots are opposite the broken screws. By operating the screw-shafts from the front of the wheel, the screws are turned a fraction of 360°, their helical surfaces engage with the rear edges of the rim slots thus forcing the rim a little farther in the same direction until the wedge-ring on the front, inner side of the rim is brought firmly to its seat, filling the space between the inner cylindrical face of the rim and the small or front edge of the cone on the felly. The fact that the rim slides over and beyond the felly at its rear base, instead of coming against a stop there, is thus important since it enables the screw-disks to drive the wedge-ring against its seat at the smaller base of the frusto-cone with any desired degree of tightness. When thus assembled, it will be seen that the contact between rim and wheel is confined to two circular edges, namely the front and rear base edges of the frusto-cone. It will be further observed that the space between the rim and wheel is tightly closed at the front and practically closed at the rear edges, that is at both base-edges of the frusto-cone, thus tending to prevent access of dirt or the like which might cement these parts together. Since there are thus in this, the best embodiment of my invention, no contacting surfaces but only two circular narrow lines in contact, the possibility of having the rim and wheel rust together is reduced to a minimum. Besides, the friction to be overcome in demounting the rim, being represented by what are, in the most perfect form of my invention, mere narrow lines in contact instead of by extended surfaces in contact, will be small, thus enabling the rim to be dislodged with a minimum of effort. Nor should we forget that the operation of the broken screws merely forces the rim a little farther in the same direction in which it was put on the wheel and that a partial turn of each screw, as against a number of entire turns, is all that is needed to complete the operation. I have found that five of these broken screws distributed around the circumference of the felly are more than sufficient to make a fastening which is absolute, so that five partial or fractional turns of the operator's tool completes the job.

Figure 4:
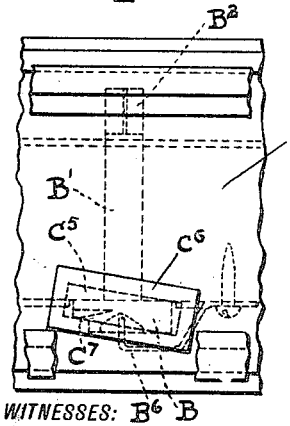
Figure 4A:
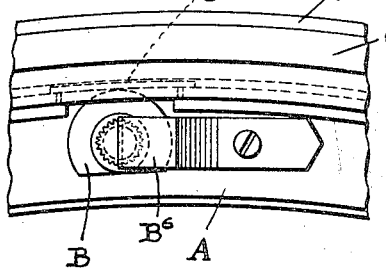
Figure 5:
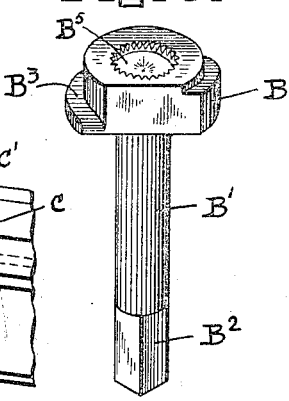

In the drawings,—Figure 1 is a side elevation of wheel and demountable rim embodying my invention; Fig. 2 is a cross section of the rim and wheel demounted, the hub and spokes being omitted; Fig. 3 is a similar cross section of the rim and wheel when assembled; Figs. 4 and 4ª are details of the nut lock for the broken screws or face cams; and Fig. 5 is a perspective view of the broken screw.

The wheel has a felly A which has a frusto-conical exterior surface embraced by a steel band A', which I consider as part of the wheel and which is also frusto-conical, the small base of the frusto-cone being at the front face of the wheel. The wheel is also supplied with a valve-stem aperture $A^2$ and with two dowel-stem apertures $A^3$ non-symmetrically arranged with reference to the valve-stem aperture for a purpose which will appear later on. The screw-disk or face cam B is in one piece with a shaft B', which laterally traverses the felly, that is in a direction about parallel to the wheel axis, and which has a shaft-operating device, here shown as a squared end $B^2$, for engagement with a turning tool carried by the operator. The helical or working face $B^3$ of the broken screw is shown as of uniform pitch; but manifestly such uniformity is not essential. The screw-disk B has a cutaway segment which makes the screw flush with the circumferential face of the felly structure in the position shown in Fig. 2.

The wheel rim C has replaceable flanges C' the outer of which is held in place by a locking-ring $C^2$ sprung into place in a depressed groove $C^3$, all in accordance with a construction now common. I have shown a pneumatic tire D and its inner tube D' and valve-stem $D^2$ for the purpose of greater clearness in illustration. It will be observed that the inner surface of the wheel rim, the surface adjacent to the felly, is a cylinder of a diameter greater than that of the small base of the frusto-cone but about equal to that of the circle defining the large base of the cone, so as to make a loose or easy fit along such circular edge. A tight, accurate or machine shop fit is naturally to be avoided. I also employ a wedge-ring $C^4$, which abuts against the walls of the groove $C^3$ on one side and against the circular edge defining the small base of the frusto-cone of the wheel on the other side. It will thus be seen that in the best embodiment of my invention the rim and wheel contact at most along two narrow circular lines and two lines only, namely the two narrow circles constituting the small and large bases of the frusto-cone of the felly-structure, the contact along the wedge-ring being the one relied on to furnish the bearing for the rim against the felly-structure. The simplicity and efficiency of such construction as against complicated interlocking parts will be apparent.

There are two inwardly projecting dowel pins $C^9$ on the inner face of the rim at unequal distance from the valve-stem aperture for engaging the apertures $A^3$ in the felly and there are slots or grooves or the like $C^5$ covered with plates $C^6$, which correspond in position with the broken screws on the felly. The rear edge or face $C^7$ of the slot $C^5$ is the one against which the helical surface $B^3$ of the face cam or broken screw presses.

The operation of attaching and detaching the pneumatic tire to the rim to repair the inner tube in case of puncture is too well known to need description here. We merely assume that it is desired to mount upon the felly a rim carrying a fully inflated tire. The screws B will be turned to have their cut away segments flush with the wheel, whereupon the valve-stem and dowel-pins on the rim are inserted into the corresponding apertures in the felly. The non-symmetrical arrangement of these dowel-pins brings with it the fact that the rim will only fit the wheel one way and this the proper way, which thus avoids trying to put the rear face of the rim against the front face of the wheel. Thereupon, by rotating the plane of the rim about an axis which is tangent to the wheel at the valve aperture, the rim slides completely on the wheel. We now manipulate the screw-disks by giving each a partial turn in a given direction. The helical screw or working surface $B^3$ of each screw thus engages the face $C^7$ of the slot $C^5$, thus forcing the rim a little farther in the same direction and bringing the wedge ring $C^4$ tight against the outer and smaller circular edge of the felly. The operation of mounting is thus finished. To demount, the reverse operations are brought into play.

In order to provide a nutlock, I supply the outer face of each screw with a depression $B^5$ which is provided with a circle of notches against which bears the edge of a spring $B^6$. This prevents the screw-disk from turning into a position in which the rim may be demounted except at the will of the operator.

The simplicity of my construction is manifest. I can, for instance, buy the rims which I use, which are to-day an article of commerce, on the open market having merely to add thereto the wedge-ring $C^4$ which is preferably a complete ring and to cut therein the slots $C^5$. To turn down the felly of the ordinary commercial wheel to a frusto-cone and to shrink thereon a frusto-conical band is equally simple. There remains to drill lateral apertures for the axes of the screw-disks and to stamp up these screws. There is no danger that the screws will fall out of the felly aperture because the pressure of the rim against them forces them firmly against the flat rear face of the felly. Again, since the only likely thrusts or pressures in running the vehicle, which would tend to dislodge the rim, happen in rounding corners and since such thrusts are toward the vehicle, it will be seen that the wedge-ring, which runs completely around the wheel, acts as an absolute stop to such dislodgment as well as exercising its functions of furnishing a seat against the front circular edge of the felly and of keeping dirt from getting between the parts. That the construction is efficient under all conditions of use and that the operations involved are simple I have shown above.

I claim,—

1. A demountable rim comprising a wheel having a frusto conical periphery, a cylindrical wheel rim loosely fitting and projecting beyond the large base circle of the wheel periphery, a wedge-ring secured to the inner surface of the rim abutting against the smaller base of the wheel periphery along a narrow circumferential line, and lateral pressure devices, mounted on the felly, for forcing the wedge-ring laterally against the wheel, substantially as described.

2. A demountable rim comprising a wheel having a frusto conical periphery; a cylindrical wheel rim fitting the larger base of the wheel periphery; grooves in said rim; a ring secured to the inner surface of the rim taking against the smaller base of the wheel periphery; and screw disks having cutaway segments, for engaging and exercising lateral pressure upon the rim-grooves, and shafts for the screw disks laterally traversing the felly, substantially as described.

3. A demountable rim comprising a wheel; a wheel-rim removably mounted thereon having grooves; screw-disks, engaging the rim-grooves, having cutaway segments and mounted on the side face of the wheel; and operating shafts for the screw disks laterally traversing the wheel, substantially as described.

4. A demountable rim comprising a wheel having a frusto conical periphery; a cylindrical wheel rim which has secured thereto a wedge-ring which contacts with the wheel periphery along a smaller base circle and is provided with a set of grooves; and screw disks, having cutaway segments, on the side face of the wheel, with shafts laterally traversing the wheel, coöperating with the rim-grooves to force the parts together, substantially as described.

In testimony whereof I have signed my name to this specification in the presence of two subscribing witnesses.

ROBERT P. SCOTT.

Witnesses:
 HOWARD D. ADAMS,
 MILLIE TETZLAFF.